United States Patent
Sauerbier et al.

(10) Patent No.: US 11,794,041 B2
(45) Date of Patent: Oct. 24, 2023

(54) METHOD FOR OPERATING A WORKING DEVICE OR RESCUE DEVICE, AND WORKING DEVICE OR RESCUE DEVICE

(71) Applicant: LUKAS Hydraulik GmbH, Erlangen (DE)

(72) Inventors: Carsten Sauerbier, Lauf (DE); Uwe Kirchner, Marloffstein (DE)

(73) Assignee: LUKAS HYDRAULIK GMBH, Erlangen (DE)

( * ) Notice: Subject to any disclaimer, the term of this patent is extended or adjusted under 35 U.S.C. 154(b) by 239 days.

(21) Appl. No.: 17/048,009

(22) PCT Filed: Apr. 17, 2018

(86) PCT No.: PCT/EP2018/059715
§ 371 (c)(1),
(2) Date: Oct. 15, 2020

(87) PCT Pub. No.: WO2019/201424
PCT Pub. Date: Oct. 24, 2019

(65) Prior Publication Data
US 2021/0402219 A1    Dec. 30, 2021

(51) Int. Cl.
*A62B 3/00* (2006.01)
*B23D 29/00* (2006.01)
*B25F 5/00* (2006.01)

(52) U.S. Cl.
CPC .............. *A62B 3/005* (2013.01); *B23D 29/00* (2013.01); *B25F 5/005* (2013.01)

(58) Field of Classification Search
CPC .......... A62B 3/00; A62B 3/005; B23D 29/00; B23D 29/02; B23D 29/023–026; B25F 5/005
See application file for complete search history.

(56) References Cited

U.S. PATENT DOCUMENTS

| | | | | |
|---|---|---|---|---|
| 4,091,698 A | * | 5/1978 | Obear ...................... | B26D 5/04 83/530 |
| 5,243,761 A | * | 9/1993 | Sullivan ................. | A62B 3/005 60/407 |

(Continued)

FOREIGN PATENT DOCUMENTS

| CN | 102581819 A | 7/2012 |
|---|---|---|
| CN | 202876142 U | 4/2013 |

(Continued)

OTHER PUBLICATIONS

Office Action for Chinese Patent Application No. 201880091582.5 dated Nov. 24, 2021, 10 pages.

(Continued)

*Primary Examiner* — Adam J Eiseman
*Assistant Examiner* — Richard D Crosby, Jr.
(74) *Attorney, Agent, or Firm* — Panitch Schwarze Belisario & Nadel LLP

(57) ABSTRACT

A method for operating an electromechanical or electrohydraulic working device or rescue device is performed by an operator person and can be used autonomously. The working/rescue device includes a cutting tool having two cutting tool halves movable toward and away from one another and define a virtual cutting plane by their movement. The working/rescues device includes a housing, an electric motor; a pump or mechanical transmission, each driven by the electric motor for actuating the tool insert. An exchangeable rechargeable electrical energy source is in/on a device side of the working/rescue device and includes a housing. During operation of the working/rescue device, orientation of the working/rescue device is sensed and the relationship between the angular position of the working/rescue device cutting plane and the force applied by the cutting tool to the (Continued)

object to be cut is established and the working/rescue device is controlled in dependence on the relationship.

10 Claims, 8 Drawing Sheets

(56) References Cited

U.S. PATENT DOCUMENTS

| | | | | |
|---|---|---|---|---|
| 5,875,554 | A * | 3/1999 | Vogelsanger | B23D 31/008 |
| | | | | 30/228 |
| 7,107,812 | B1 * | 9/2006 | Patton | A62B 3/005 |
| | | | | 72/464 |
| 7,255,295 | B2 * | 8/2007 | Ramun | E02F 9/006 |
| | | | | 241/101.73 |
| 7,568,372 | B1 * | 8/2009 | Patton | A62B 3/005 |
| | | | | 72/464 |
| 7,937,838 | B2 * | 5/2011 | Patton | B26B 15/00 |
| | | | | 30/228 |
| 10,751,815 | B2 * | 8/2020 | Tischler | B23D 35/002 |
| 11,000,713 | B2 * | 5/2021 | Sauerbier | B25F 5/00 |
| 2011/0214471 | A1 * | 9/2011 | Wettlaufer | B25F 5/005 |
| | | | | 72/332 |
| 2012/0284981 | A1 * | 11/2012 | Bungter | B25B 27/10 |
| | | | | 29/237 |
| 2014/0123824 | A1 * | 5/2014 | Strohmeier | B23D 35/002 |
| | | | | 83/694 |
| 2015/0071791 | A1 * | 3/2015 | Sauerbier | F15B 1/26 |
| | | | | 417/44.2 |
| 2015/0217143 | A1 | 8/2015 | Palmer et al. | |
| 2019/0083821 | A1 * | 3/2019 | Sauerbier | B25F 5/00 |
| 2019/0255631 | A1 * | 8/2019 | Tischler | B23D 35/002 |
| 2020/0094332 | A1 * | 3/2020 | Kimura | B23D 31/008 |

FOREIGN PATENT DOCUMENTS

| | | |
|---|---|---|
| CN | 103481250 A | 1/2014 |
| CN | 104941089 A | 9/2015 |
| CN | 107414960 A | 12/2017 |
| DE | 10 2015 108 833 B3 | 10/2016 |
| WO | 2005/120757 A1 | 12/2005 |
| WO | 2017/190799 A1 | 11/2017 |

OTHER PUBLICATIONS

Office Action for Indian Patent Application No. 202017040424 dated Jun. 17, 2021, 5 pages.
Office Action for Japanese Patent Application No. 2020-555173 dated Nov. 25, 2021, 12 pages.
International Search Report and Written Opinion of the International Searching Authority for International Patent Application No. PCT/EP2018/059715 dated Jan. 11, 2019, 12 pages.

* cited by examiner

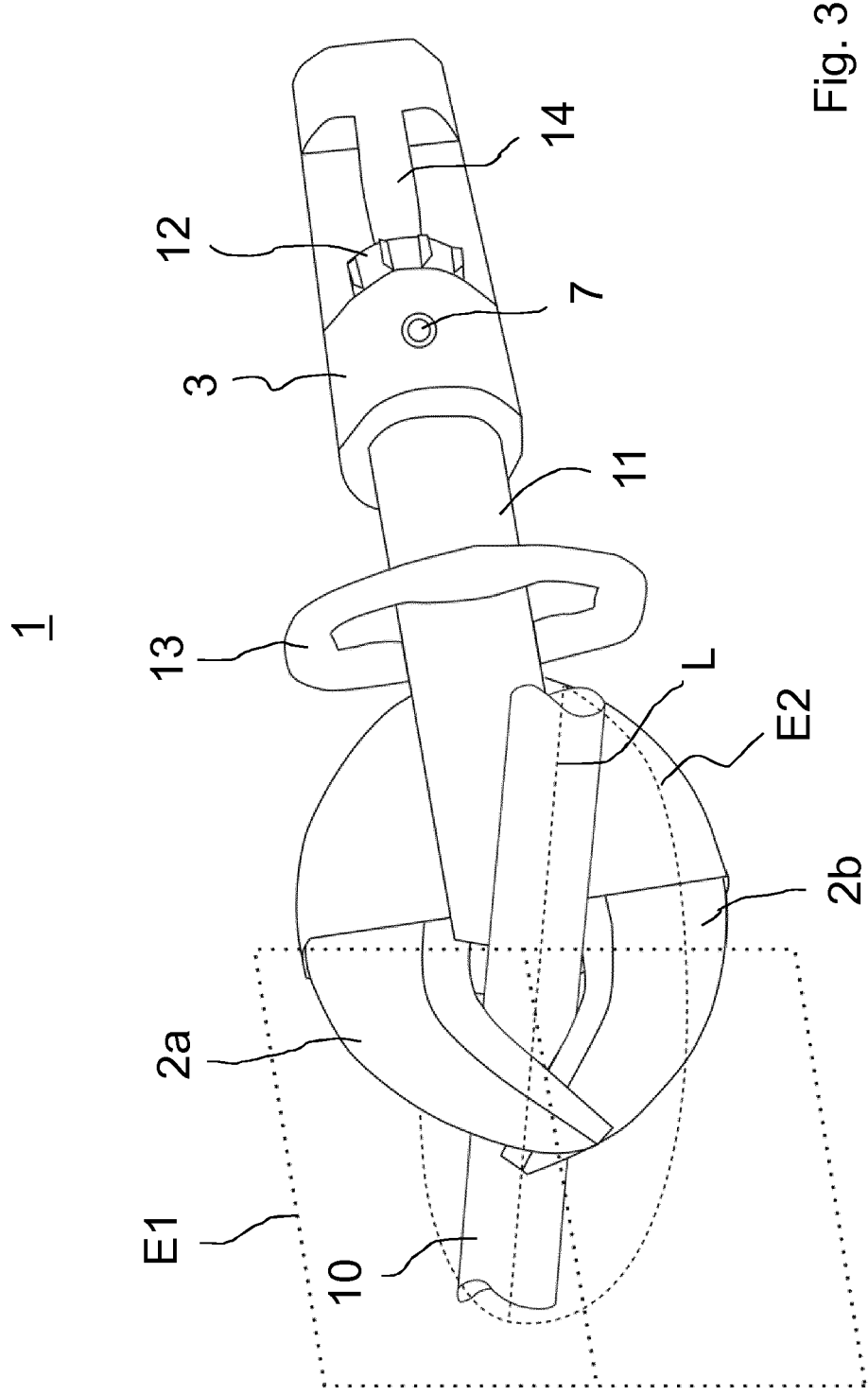

METHOD FOR OPERATING A WORKING DEVICE OR RESCUE DEVICE, AND WORKING DEVICE OR RESCUE DEVICE

This application is a National Stage Application of PCT/EP2018/059715, filed 17 Apr. 2018, and which application is incorporated herein by reference. To the extent appropriate, a claim of priority is made to the above-disclosed application.

The invention relates to a method for operating a working device or rescue device according to the preamble of claim 1 and to a working device or a rescue device according to the preamble of claim 14.

Technological Background

Portable motor-driven working devices or rescue devices of the type in question here that may be worn by an operator are used in various applications. There therefore exist cutting devices, for example, which are used by the emergency services (fire department) to rescue injured persons from vehicles that have been in an accident or to free earthquake victims, for example. There are numerous types of working devices or rescue devices here. There are electro-hydraulically or electromechanically driven working devices or rescue devices, comprising tool inserts, preferably hardened tool inserts, for cutting, expanding or for lifting. Such devices are subjected to extremely high mechanical demands during use and to a wide variety of environmental influences (heat, cold, moisture) depending on the site of use.

As a result of the technical advancement in the automobile industry, increasingly hard materials are being increasingly used. Rescue devices must therefore be designed in accordance with these increasing requirements.

When cutting very hard materials, although the cutting blades or shearing blades of cutting devices may penetrate the object to be cut (for example an A or B column of a vehicle), they then do not advance any further into the material despite the force that continues to build up. The force that continues to build up or the resultant pressure leads to the cutting device beginning to gradually rotate under the load with respect to the object to be cut. This may, in turn, cause the cutting blades or shearing blades to be spread further and further apart and as a result components, such as the central bolt about which the cutting blades or shearing blades rotate, to come under increasing strain. In the worst case, components may even break under such conditions. This may in turn cause components to shoot off and injuries to the operator as a result.

PRIOR ART DOCUMENTS

WO 2017/190799 A1 discloses a method according to the preamble of claim 1. In this method, a wide range of operating data are recorded during operation of the working device or rescue device and transferred to a data carrier or data store housed in the electrical energy source. The operating data deposited in the data carrier or data store of the electrical energy source are read out by a charger, further transmitted to a network and deposited centrally. The purpose of this measure is mainly to generate an operating history with respect to the use of every device and to document it centrally. The operating data may be various parameters, including the current drawn by the electric motor or the orientation of the working device or rescue device in space. Every working device comprises an individual ID for identifying the individual working device inside the documentation.

DE 10 2015 108 833 B3 relates to a rescue device for separating structures and to a method for controlling a rescue device using at least one blocking sensor, which records the separation movement and gives off a blocking signal when the separation movement comes to a halt or falls below a predetermined minimum speed. A force sensor or pressure sensor, for example in the form of a strain gauge, may be provided as the blocking signal, for example.

Object of the Present Invention

The object of the present invention consists in providing a generic method that ensures greater operating safety. Furthermore, the object consists in providing a corresponding work or rescue device.

Achievement of the Object

Expedient embodiments of the invention are claimed in the dependent claims.

Since the angular position W of the cutting plane E1 of the working device or rescue device in space or in relation to the position/orientation of the object to be cut and/or the force applied to the object to be cut by the cutting tool are set in relation to one another and the working device or rescue device is controlled on the basis thereof, damage to the working tool or rescue device or injuries to the operator may be effectively prevented in a working device or rescue device that rotates relative to the object to be cut under load. In this case, "cutting plane E1" means the plane that is formed by the particular cutting edge of the particular cutting tool half as it is pivoted. In the light of this, increased operational safety is ensured in comparison with previous working devices or rescue devices.

According to the invention, the force applied to the object to be cut or the resultant pressure is preferably established by establishing the current P1 drawn by the electric motor, or is derived therefrom. The more the electric motor draws current, the greater its drive torque or the pressure or force that is built up by means of the pump driven by the electric motor.

The angular position W and/or the force P and/or the current P1 and/or a parameter formed therefrom is/are expediently compared with setpoints, a setpoint characteristic curve and/or a setpoint characteristic map and/or a look-up table and an operating event G is triggered on the basis thereof.

For example, an operating event G may be triggered when the angular position W reaches or exceeds a preset critical angular deviation W(krit).

The angular deviation W(krit) may be from 10 to 30°, for example, based on a starting position, preferably from 10 to 20°.

An operating event G may, for example, also be triggered when the angular position W and the force P or the current P1 are combined. For example, a new control parameter may be established from a combination (or the relationship) of the above-mentioned parameters.

The operating event G may be in particular
a warning being issued, for example a warning sound and/or a visual warning signal,
an overload limit coming into effect, in which the force or the pressure, for example, may not be increased further, for example due to a particular motor control, and/or an alternative way of influencing the control of the electric motor being, and/or the operating data relating to the angular position W, angular deviation W(krit), force P, current P1 and/or real time T being stored.

Since at the beginning of a cutting process, for example when cutting through an A or B column of a vehicle that has been in an accident, the working device or rescue device may be arranged in an undefined spatial position with respect to the horizontal, according to the invention an initialization is carried out in order to determine the angular position W of the cutting plane E1 of the working device or rescue device in space or in relation to the position of the object to be cut. This initialization expediently takes place at the start of the cutting process, i.e. at the end of the movement phase of the cutting tool halves without load, i.e. the phase in which the cutting tool halves are only moved towards the object to be cut. At the end of this phase, the cutting tool halves are usually positioned at an at least substantially perpendicular angle to the object to be cut.

With the initialization, a defined initial angular position W is established, at least substantially, from where the change in the angular position W is measured. For example, this is an angular position W in which the cutting plane is arranged at a 90° angle to the longitudinal axis or the longitudinal extension of the object to be cut. However, this does not necessarily have to be the case.

The initialization is preferably carried out when a specific force P or pressure or a specific current P1 that is drawn by the electric motor is reached. For example, this is an operating phase in which the cutting process has already begun, i.e. when the force P or the pressure or the current P1 drawn by the electric motor begins to increase or has reached a specific value.

The method according to the invention expediently takes place in real time, i.e. under an actual time condition, and therefore a control intervention may be made immediately during operation, provided the conditions are present for the operating event G.

The invention also relates to an electromagnetic or electro-hydraulic working device or rescue device, which may be worn by an operator, may be used independently.

DESCRIPTION OF THE INVENTION ON THE BASIS OF EMBODIMENTS

An expedient embodiment of the present invention will be explained in more detail in the following, in which:

FIG. 3 is a perspective view of the rescue device according to FIG. 1 at the start of the cutting process;

Figure 1:
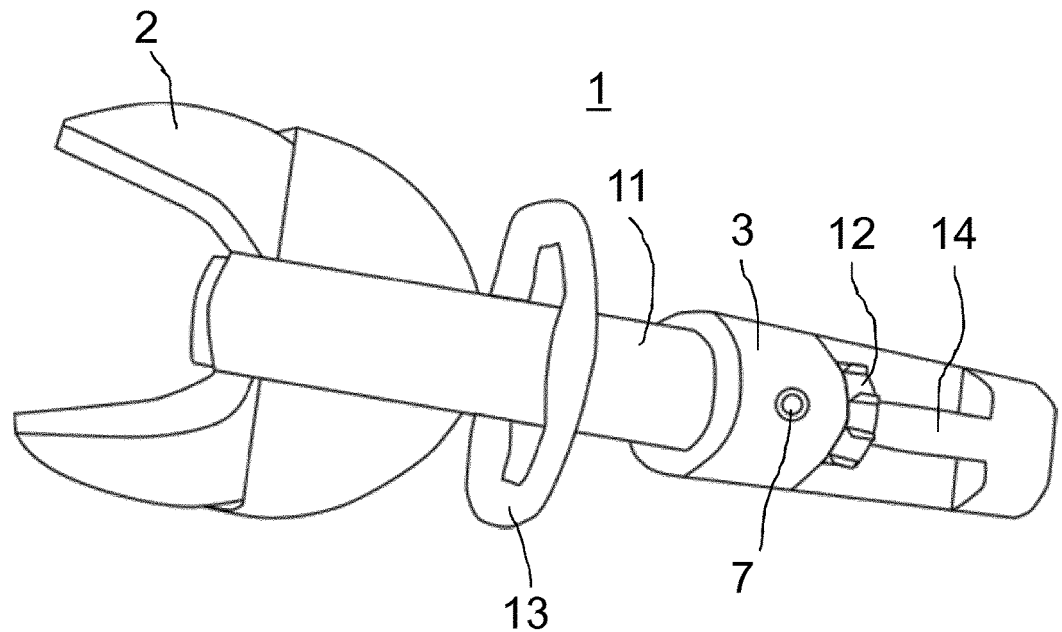
FIG. 1 is a plan view of a rescue device for use in the method according to the invention.

Reference numeral 1 in FIG. 1 denotes an example of a working device or rescue device that may be worn by an operator and may be used independently. In the present case, this is an electro-hydraulic cutter, which is often used by the fire department as a rescue device for freeing persons trapped in vehicles that have been in an accident. The device comprises a housing 3 having a handle 14 and a manually actuable on-off valve 12 in the form of a star valve. Reference numeral 7 denotes the main switch arranged on the housing 3. A cylinder 11 adjoins this housing 3, on which a carrying handle 13 is likewise arranged. A cutting tool 2 in the form of a tool insert consisting of two cutting tool halves 2a, 2b made of hardened material, which are mounted so as to be rotatable about a bolt (central bolt) (not visible in FIG. 1) is arranged on the front of the cylinder 11. Depending on the operation of the on-off valve 12, the two cutting tool halves 2a, 2b may be moved towards or away from one another.

Figure 2:
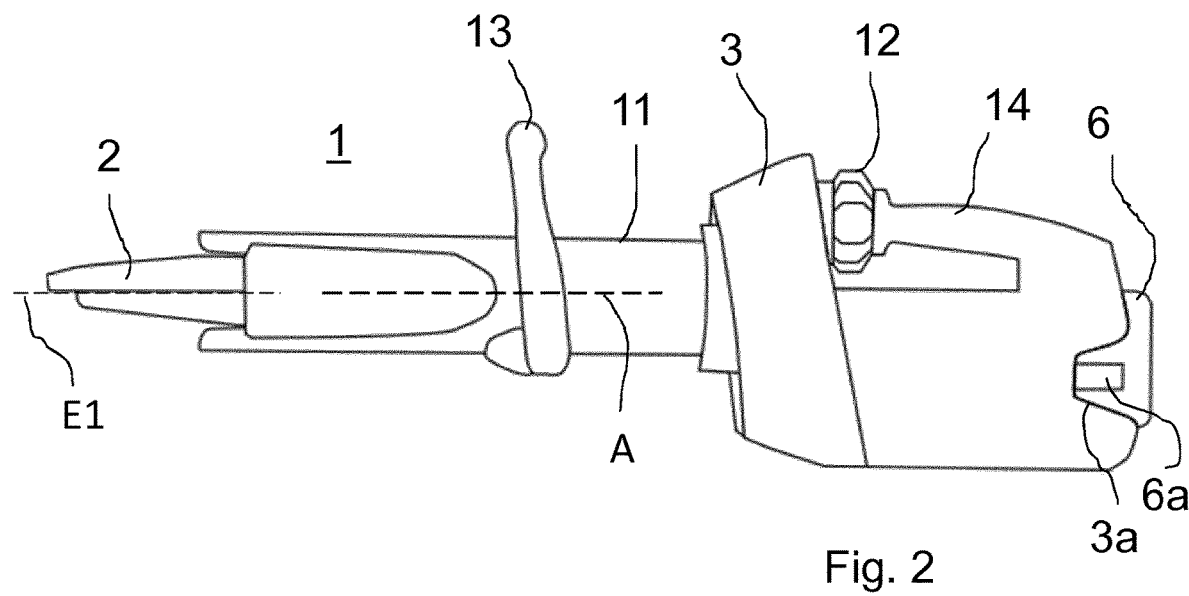
FIG. 2 is a side view of the rescue device according to FIG. 1.

As may be seen from FIG. 2, a storage battery having its own housing may be provided as the energy source 6, which battery may be inserted into a corresponding receiving shaft 3a of the housing 3. In order to fix the energy source 6 in the receiving shaft 3a of the housing 3, the energy source 6 comprises retaining clamps 6a arranged on either side, which may be operated by the press of a finger, in order to be able to remove the energy source 6 from the receiving shaft 3a. Inside the housing there is an electric motor (not shown in FIGS. 1 and 2), which is provided to drive a hydraulic pump (not shown in FIGS. 1 and 2 either). When the main switch 7 is operated, the electric motor and therefore the pump are switched on or off. By means of the on-off valve 12, the device may be operated by the operator either in a stand-by mode (no application of the cylinder 11, the cutting tool inserts 2a, 2b do not move) or in a cutting mode (the tool inserts 2a, 2b move towards one another) or in an open mode (the tool inserts 2a, 2b move away from one another). In the cutting mode in which the tool inserts 2a, 2b move towards one another, the cutting tool inserts 2a, 2b may either be brought to the object to be cut or the material may be cut.

The two cutting tool halves 2a, 2b define a cutting plane E1, which is shown in FIG. 2, by means of their touching cutting edges during their pivot movement about the bolt. A denotes the longitudinal axis of the working device or rescue device 1.

FIG. 3 shows the rescue device 1 and an object to be cut 10 at the beginning of a cutting situation. The two cutting tool halves 2a, 2b engage on either side of the object to be cut 10. The cutting plane E1 is shown perspectively in FIG. 3 as a dotted plane. In this case, at the beginning of the cutting process, the cutting plane E1 extends at a substantial right angle to the longitudinal axis L of the object to be cut 10 or to a plane E2 that is defined by an (imaginary) rotational movement of the object to be cut 10 about an (imaginary) axis of rotation D that is positioned in the cutting pane E1.

Figure 4A:
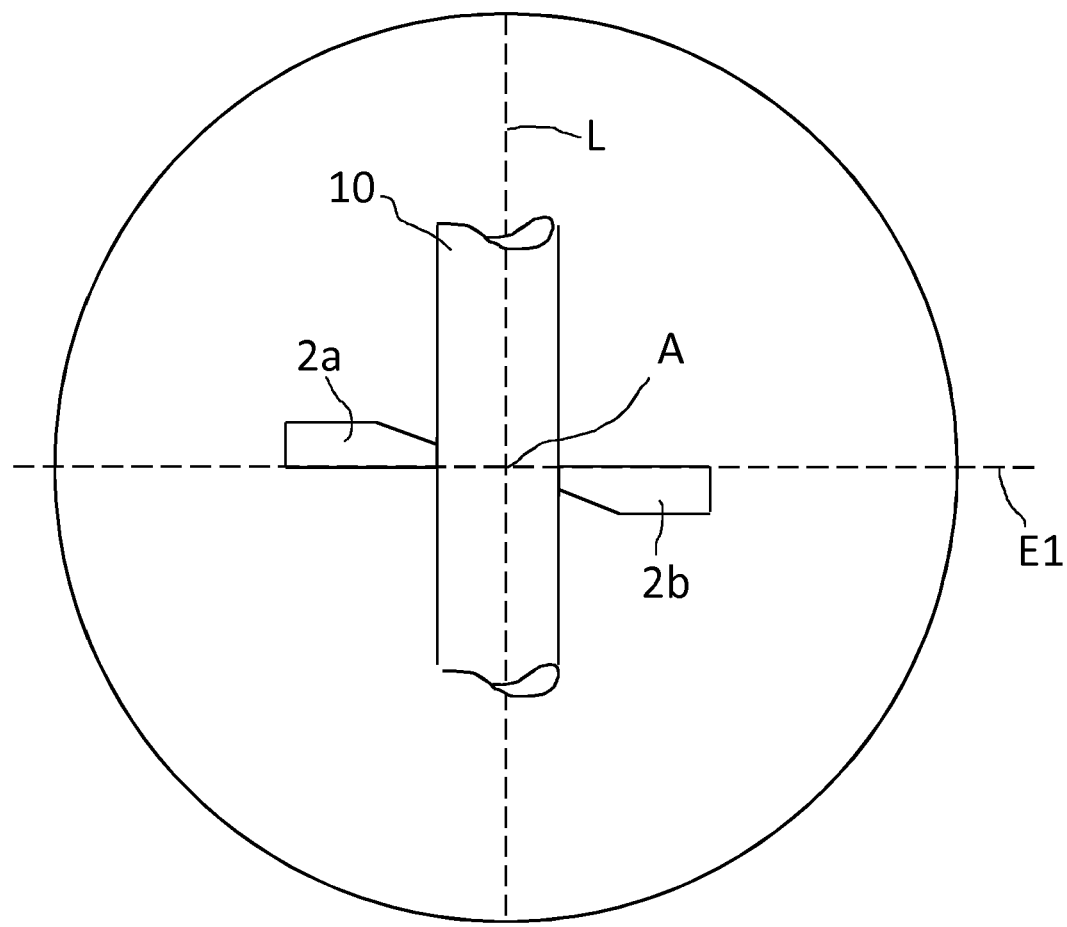
FIG. 4 is a greatly simplified partial representation of different views of the position of the object to be cut in relation to the cutting tool halves of the rescue device according to FIG. 1.
Figure 4B:
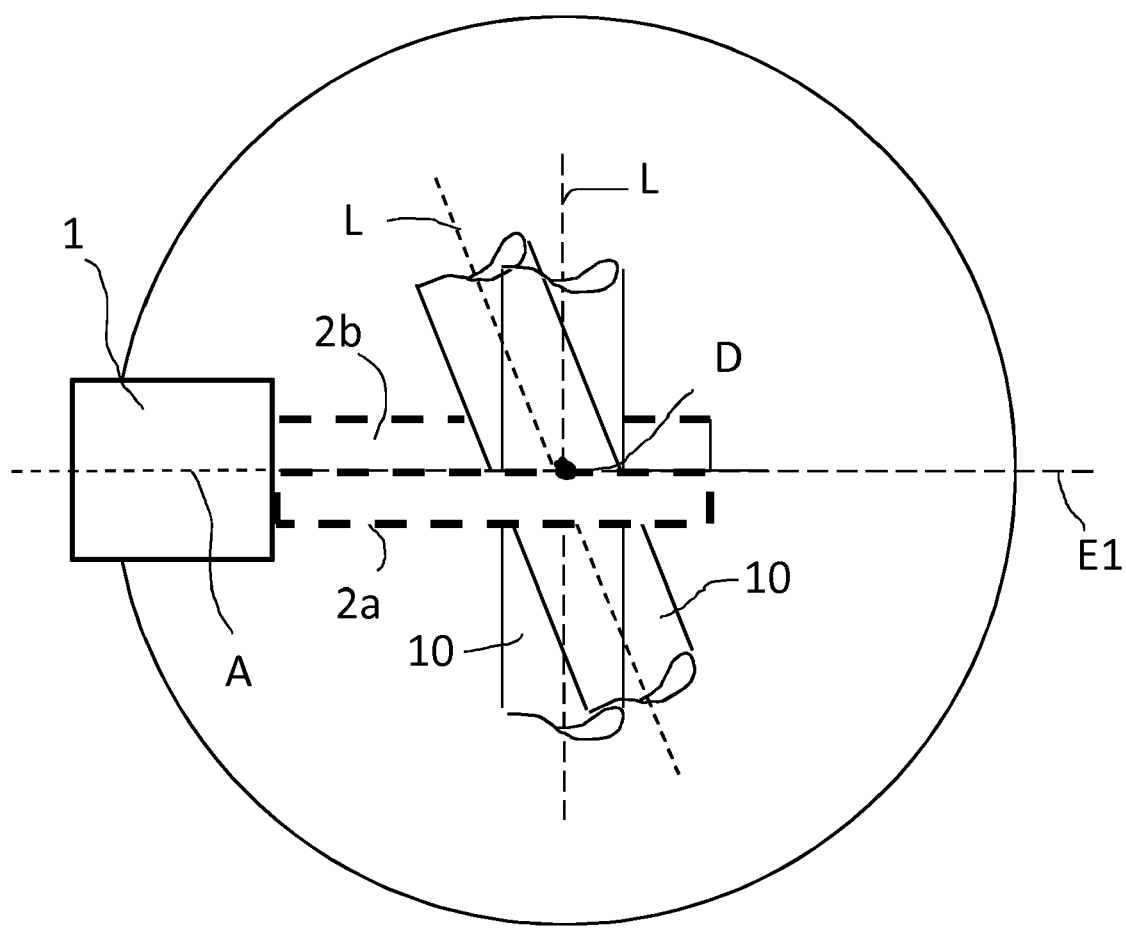

FIG. 4b shows this situation with the two cutting tool halves 2a, 2b depicted by dashes in a largely simplified partial sectional view. Provided that the object to be cut 10 is rotated about the axis of rotation D that lies in the cutting plane E1, the cutting plane E1 remains at a substantial right angle to the longitudinal extension or longitudinal axis L of the object to be cut 10. A denotes the longitudinal axis of the working device or rescue device 1 (cf. FIG. 2).

The representation according to FIG. 4a shows a front view of only the two cutting tool inserts 2a, 2b that engage on the top and bottom of the object to be cut 10. The representation according to FIG. 4a is a view in the cutting plane E1.

The situation shown in FIG. 4a depicts the beginning of the cutting process, in which the two cutting tool halves 2a, 2b have moved towards the object to be cut 10 or, as shown, rest thereagainst. In this phase, the cutting plane E1 is usually at least substantially oriented at a 90° angle to the longitudinal axis L of the object to be cut 10. When the cutting tool continues to be operated, the two cutting tool halves 2a, 2b gradually penetrate the material of the object to be cut 10.

Figure 4C:
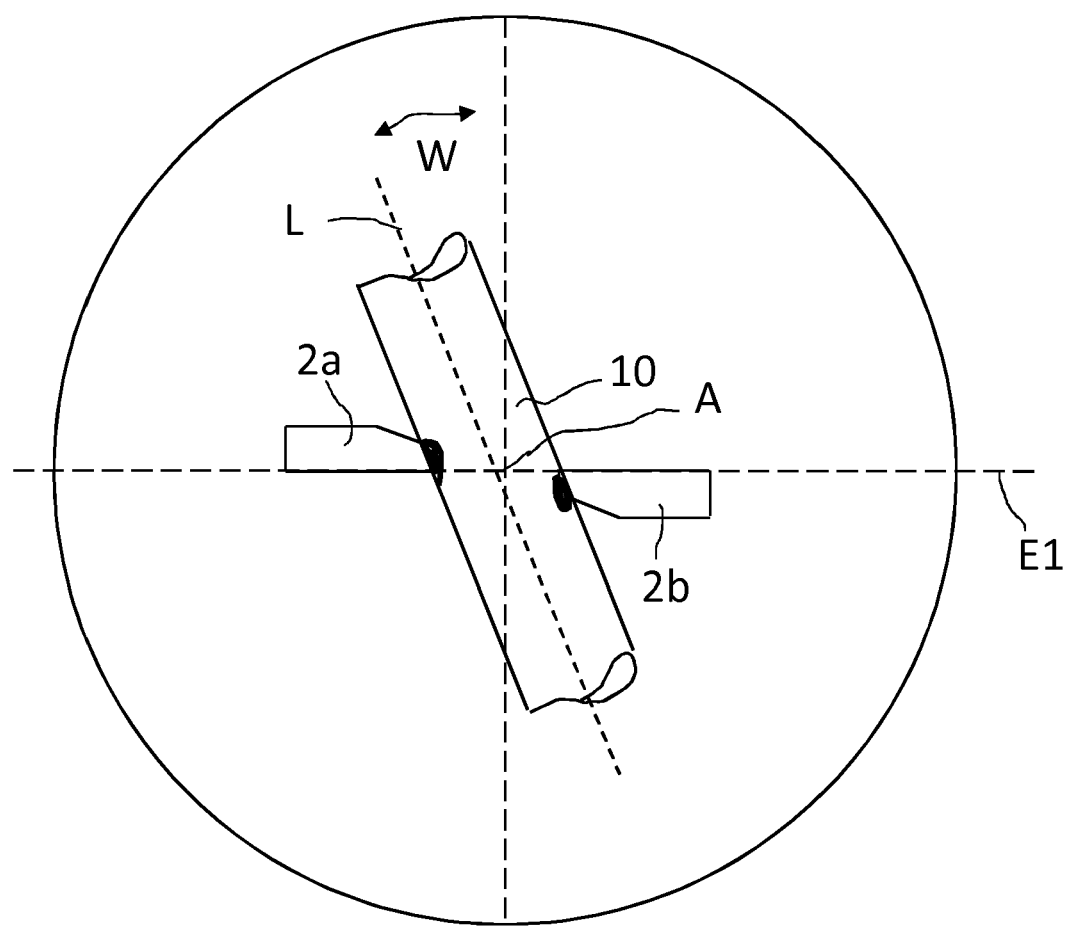

As may be seen from FIG. 4c, the increasing pressure or the increasing force, in particular in a hard object to be cut 10, causes a gradual rotational movement or pivot movement of the rescue tool 1 about its longitudinal axis A and therefore its cutting plane E1 relative to the longitudinal axis L or to the plane E2, cf. FIG. 3, of the object to be cut 10. The rotational or pivot movement determines the angular position W. This gradual rotational or pivot movement leads to increasing force vectors, which attempt to mutually spread the two cutting tool inserts 2a, 2b apart. In this case, the angular position W means the angular position of the cutting plane E1 with respect to the longitudinal orientation or the longitudinal axis L of the object to be cut 10 or the plane E2. This is initially usually substantially 90° to the cutting plane E1 and changes as the pressure or force increases. However, the initial angle may also be an angle that is not 90° for a specific object to be cut or under specific conditions.

For this purpose, the angular position W of the cutting plane E1 of the working device or rescue device 1 is initialized in space and/or in relation to the position of the object to be cut 10. After the initialization, the change in the angular position W that occurs during the cutting process is measured.

The initialization expediently takes place at a point or/and during a phase when the force reaches a specific value and/or increases due to the cutting process that has begun. A specific value for the current P1 drawn by the motor or a specific flow thereof may particularly advantageously be used for the initialization. If, for example, the working device or rescue device 1 is put into operation, the two cutting edges are guided to the object to be cut and the cutting process is then begun, the force or the pressure or the current P1 drawn by the motor increases. When a preset force variable or the pressure or current P1 drawn by the motor is reached, the initialization of the angle measurement is triggered.

According to the present invention, the permissible angular position W is only limited to a specific pivoted range, for example to a deviation range of 10-30°, preferably of from 10 to 20°, with respect to the 90° position in each case. The end of the permissible range defines an angular deviation W(krit), it being possible for an operating event G to be triggered if this deviation is exceeded. The operating event G may be a warning being issued, an overload limit coming into effect, the control of the electric motor being influenced and/or the operating data relating to the angular position W, angular deviation W(krit), force P, current P1 and/or the real time T being stored.

The invention therefore makes it possible to targetedly detect a hazardous situation when operating rescue or working devices and to take corresponding control measures for the specific case.

The force or pressure applied to the object to be cut 10 by the two cutting tool inserts 2a, 2b may advantageously be derived from the current P1 drawn by the electric motor. In this respect, a new control variable may be created from the angular position W and the force P or the current P1, which makes it possible to effectively record this specific operating situation.

The angular position W and/or the force P and/or a parameter formed therefrom may be compared with setpoints, a setpoint characteristic curve and/or a setpoint characteristic map. At least one operating event G may be triggered on the basis thereof. The operating event G may, for example, be a warning being issued and/or an overload limit coming into effect and/or an alternative control intervention of the electric motor 4.

Figure 5:
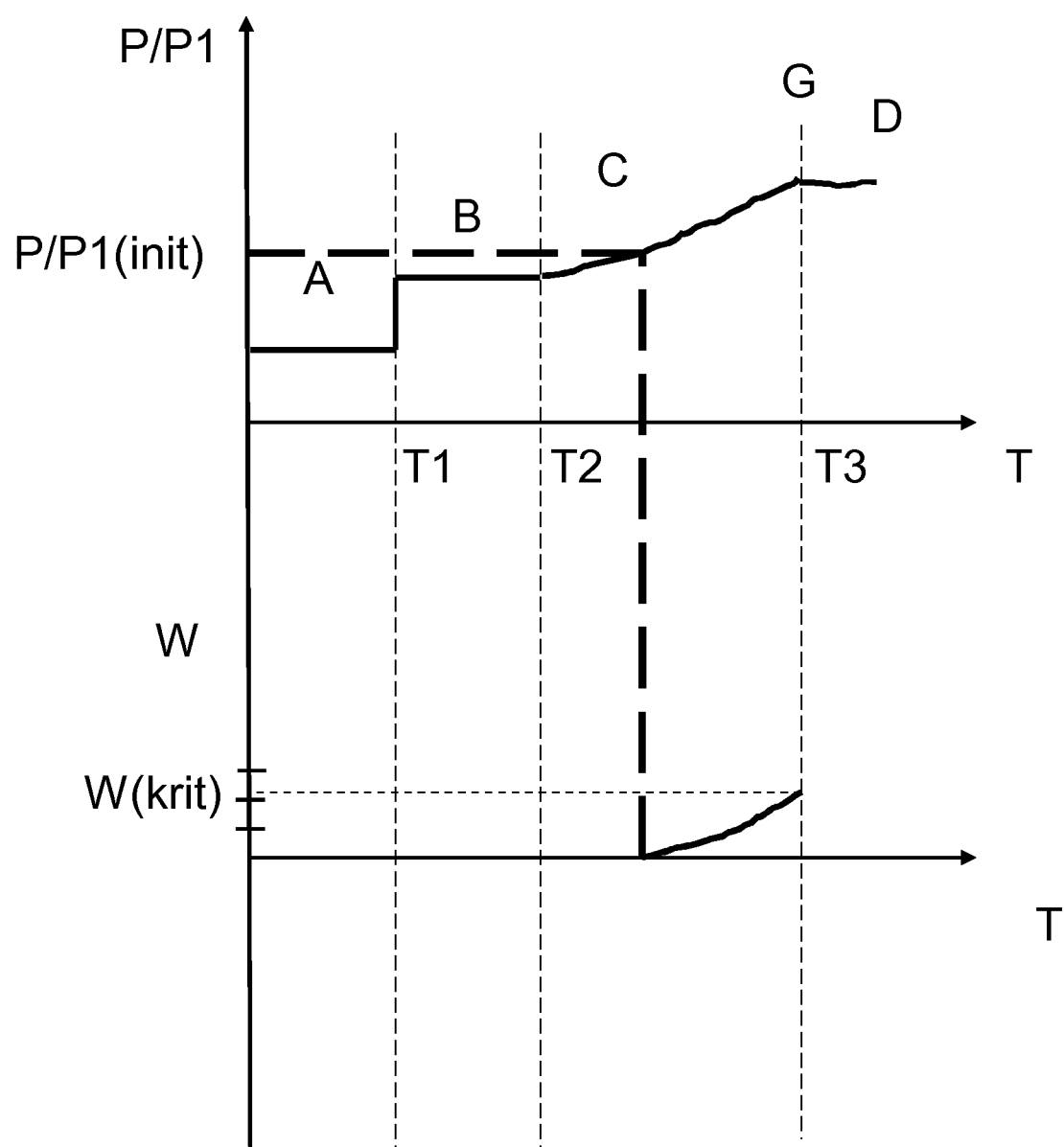
FIG. 5 is a greatly simplified representation of the changes to different parameters over time.

The graphic view in FIG. 5 shows the change in the current P1 drawn by the electric motor over time T. The rescue device is initially put into operation by operating the main switch 7. As a result, the electric motor is started and is idle (phase A). After a specific amount of time T1, the operator operates the on-off valve 12, which causes hydraulic liquid to be conveyed and the two cutting tool halves 2a, 2b to move towards the object to be cut 10 without load (load-free phase B). At a time point T2, the two cutting tool halves 2a, 2b engage on the outside of the object to be cut 10 and gradually penetrate the material. From this point or region, the force P or the pressure on the object to be cut 10 increases as a result of the resistance of the object to be cut 10 (phase C). During the load period C, the current drawn by the electric motor continuously increases. The force P or the pressure accordingly also increases.

A specific force P(init) (or pressure) or drawn current P1(init) may advantageously be used to initialize the measurement of the angular position W or the change thereto (dashed line in FIG. 5). Initialization means that the measurement of the angular position W begins from this point. Therefore, from this point in time, both the force (pressure) and the angular position may be set in relation to one another and used to control the operation of the working device or rescue device 1. Automatic initialization of the angular position W may therefore advantageously be achieved.

In hard materials, this force or pressure increase causes the cutting plane E1 of the rescue device to gradually pivot with respect to the longitudinal axis or longitudinal orientation L of the object to be cut 10, as already shown in FIG. 4c. This pivot movement is depicted in the second representation in FIG. 5, in which the angle of rotation W is given in degrees over time. When the angular position W(krit) is reached, at least one operating event G is automatically triggered. For example, as shown in FIG. 5, the force (pressure) or the current drawn by the electric motor may be limited by the control such that, in spite of the operation, no more additional mechanical loads may be placed on the structural parts of the working device or rescue device 1. A visual and/or acoustic warning may likewise be given.

As may be seen from FIG. 5, according to the invention two parameters may be set in relation to one another by means of the parameters the angle of rotation W and the force P or pressure or current P1 drawn by the electric motor in order to record an inadmissible rotational movement of the recue device 1 with respect to the object to be cut 10 and to prevent it by triggering an operating event G.

Figure 6:
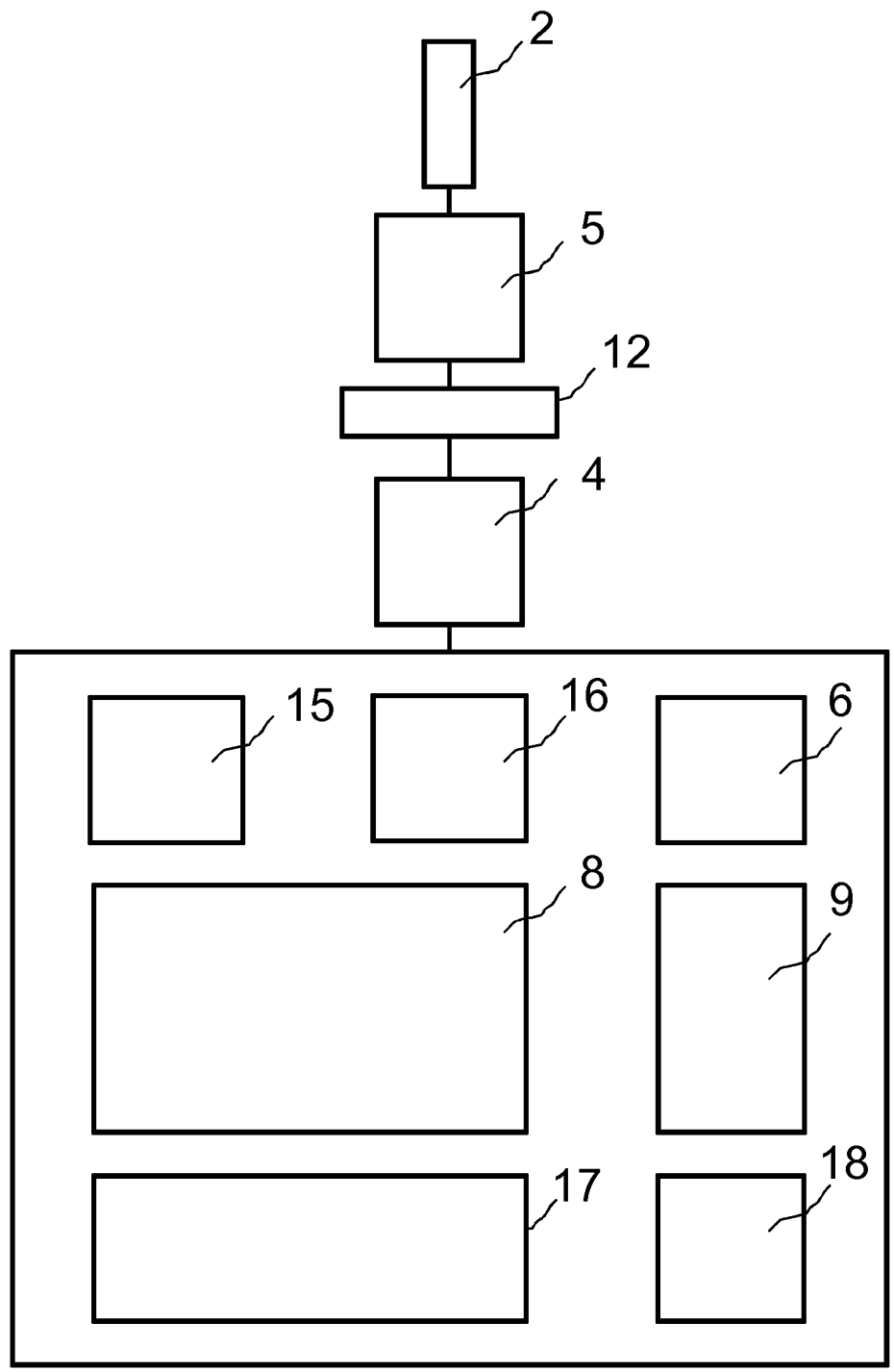
FIG. 6 is a greatly simplified representation of the functional hardware components for use in the method according to the invention.
Figure 7:
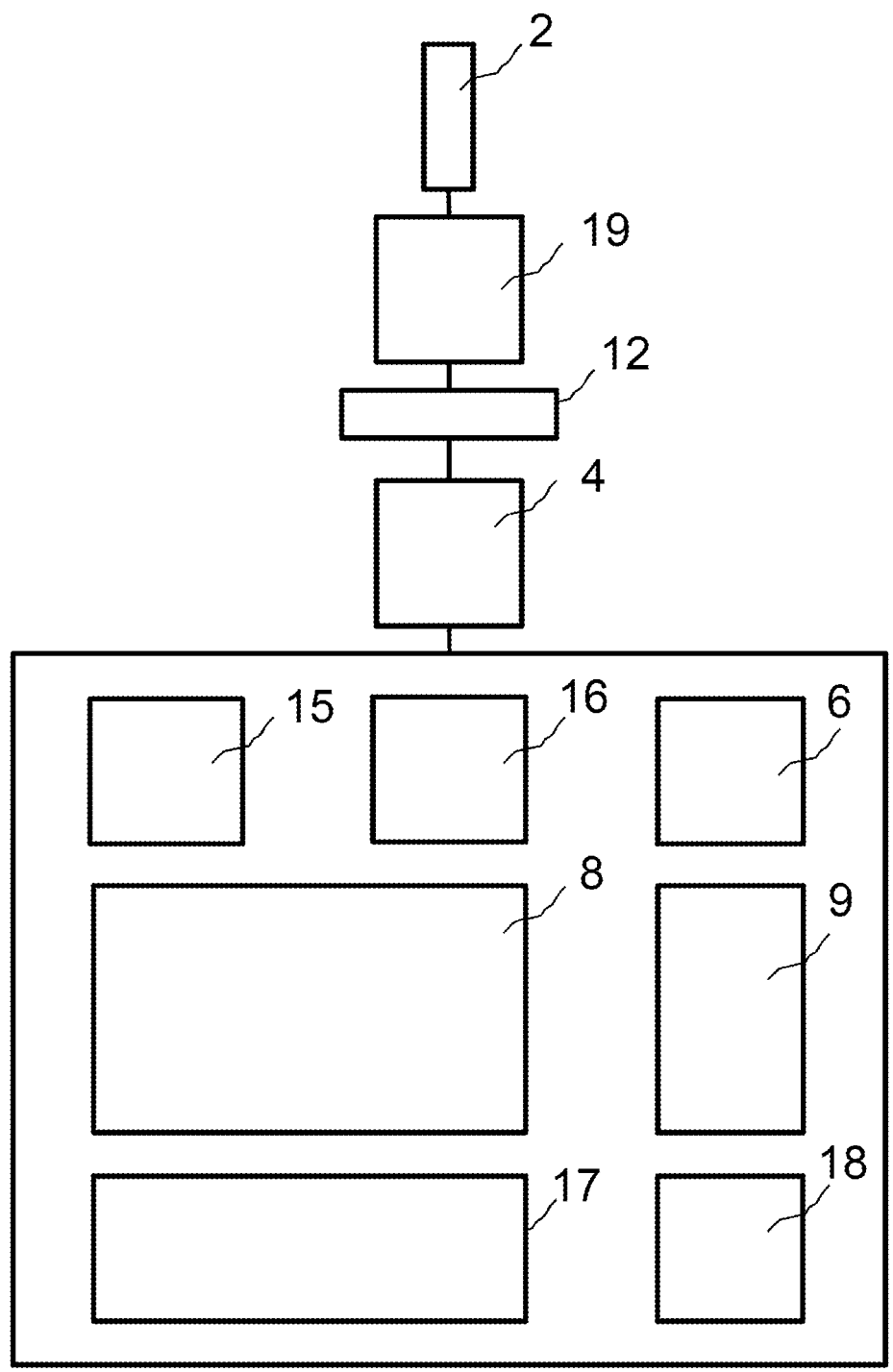
FIG. 7 is a greatly simplified representation of an alternative configuration of the functional hardware components for use in the method according to the invention.

FIG. 6 shows the individual functional components of the control according to the invention for operating the method according to the invention. The pump 5 for conveying the hydraulic liquid and operating the cutting tool 2 is driven by the electric motor 4, which in turn obtains its energy from the energy source 6, for example from a storage battery. Alternatively, as shown in FIG. 7, a mechanical transmission 19 may be driven by the electric motor 4 to operate the cutting tool 2. Reference numeral 8 denotes a microprocessor, which performs the individual functional tasks of the control and is connected to a position sensor 15 and a current sensor 16. Furthermore, the microprocessor 8 is also connected to a display 9, which is arranged on the rescue device or working device, to a store 17 and to an acoustic module 18. A warning may be issued in the display 9 in the form of an operating event G. Alternatively or in addition, an acoustic signal may be generated in an acoustic module 18 for this case. Furthermore, the relevant parameters, for example the angular position W, the force P or the pressure and/or the current P1 drawn by the electric motor, or a combination thereof, may be deposited in a store 17. As a result, in particular the operating event G may be documented under real-time conditions T. A position sensor 15 is likewise connected to the microprocessor 8. This position sensor 15 may be a rate of rotation sensor or a gyroscope, which allows for a movement in the X, Y and Z direction and a rotation about the X, Y and Z direction. Furthermore, the microprocessor 8 is connected to a sensor 16 that records the current P1 drawn by the motor. The control may comprise means that allow for a switchable power limitation of the motor.

The method according to the invention is preferably carried out in real time. This makes it possible to avoid dangerous operating situations and damage caused thereby.

LIST OF REFERENCE SIGNS 1 rescue device
2 cutting tool
2a cutting tool half
2b cutting tool half
3 housing
3a receiving shaft
4 electric motor
5 pump
6 energy source
6a retaining clamps
7 main switch
8 microprocessor
9 display
10 object to be cut
11 cylinder
12 on-off valve
13 carrying handle
14 handle
15 position sensor
16 current sensor
17 store
18 acoustic module
D axis of rotation
E1 cutting plane
E2 plane
operating event
L longitudinal axis
P force
P1 current
T real time
W angular position
W(krit) angular deviation
A longitudinal axis

The invention claimed is:

1. A method for operating an electromechanical or electrohydraulic working device or rescue device, which may be worn by an operator, may be used independently and comprises:

a cutting tool having two cutting tool halves, the two cutting tool halves are movable towards and away from one another and define a virtual cutting plane by their movement, a housing, an electric motor, a pump driven by the electric motor or a mechanical transmission driven by the electric motor, the pump or the mechanical transmission operating the cutting tool, a rechargeable replaceable electrical energy source housed in or on the working device or rescue device, and a control including a position sensor and a current sensor;

the method comprising:

recording, via the position sensor, an orientation of the working device or rescue device during operation of the working device or rescue device, determining, via the current sensor, the force applied by the two cutting tool halves to the object to be cut as the current drawn by the electric motor over time, initializing the angular position of the cutting plane of the working device or rescue device in space, the angular position being a position of the cutting plane with respect to a plane being defined by an imaginary rotational movement of the object to be cut about an imaginary axis of rotation oriented in the cutting plane, measuring a degree of change of the angular position of the cutting plane from the angular position defined by the initializing step, setting the degree of change of the angular position of the cutting plane and the force applied to the object to be cut in relation to one another, controlling the working device or rescue device, via the control, based on the relation between the degree of change of the angular position of the cutting plane and the force applied to the object to the cut, and triggering an operating event via the control depending on the relation between the degree of change of the angular position of the cutting plane and the force applied to the object to be cut.

2. The method as per claim 1, wherein the angular position and/or the force and/or a parameter formed therefrom is/are compared with setpoints, a setpoint characteristic curve and/or a setpoint characteristic map and an operating event is triggered on the basis thereof.

3. The method as per claim 1 wherein, when the angular position reaches a preset critical angular deviation, an operating event is triggered.

4. The method as per claim 3, wherein the angular deviation is from 10 to 30°.

5. The method as per claim 3, wherein the operating event is
a warning being issued, and/or
an overload limit coming into effect, and/or
the electric motor being controlled.

6. The method as per claim 1, wherein the initialization takes place at a point or/and during a phase when the force reaches a specific value and/or increases due to the cutting process beginning.

7. The method as per claim 1, wherein a measured value for the current drawn by the motor or the flow thereof is used for the initialization.

8. The method as per claim 1, wherein the change in the angular position of the cutting plane of the working device or rescue device is established in space during cutting.

9. The method as per claim 1, wherein the rotary position and/or rotation of the working device or rescue device about a longitudinal axis or about a parallel axis is recorded as the angular position.

10. An electromechanical or electro-hydraulic working device or rescue device that may be worn by an operator, may be used independently and comprises:
- a cutting tool having two cutting tool halves, which may be moved towards and away from one another and define a virtual cutting plane by movement of the two cutting tool halves,
- a housing,
- an electric motor,
- a pump driven by the electric motor or a mechanical transmission driven by the electric motor, the pump or the mechanical transmission operating the tool insert,
- a replaceable rechargeable electrical energy source housed in or on the working device or rescue device,
- a control including a position sensor and a current sensor, and
- a microprocessor designed such that the orientation of the working device or rescue device is recorded by the position sensor during operation of the working device or rescue device,
- the force applied to the object to be cut by the two cutting tool halves being determined via the current sensor based on the current drawn by the electric motor over time,
- the angular position of the cutting plane of the working device or rescue device being initialized in space, the angular position being a position of the cutting plane with respect to a plane being defined by an imaginary rotational movement of the object to be cut about an imaginary axis of rotation oriented in the cutting plane, whereby a degree of change of the angular position of the cutting plane from the initialized angular position is measured,
- the degree of change of the angular position of the cutting plane in space and the force applied to the object to be cut by being set in relation to one another,
- the working device or rescue device being controlled, via the control, based on the relation between the degree of change of the angular position of the cutting plane and the force applied to the object to the cut, and
- an operating event being triggered via the control depending on the relation between the degree of change of the angular position of the cutting plane and the force applied to the object to be cut.

* * * * *